US009906477B2

(12) United States Patent
Chen et al.

(10) Patent No.: US 9,906,477 B2
(45) Date of Patent: Feb. 27, 2018

(54) DISTRIBUTING RETAINED MESSAGES INFORMATION IN A CLUSTERED PUBLISH/SUBSCRIBE SYSTEM

(71) Applicant: International Business Machines Corporation, Armonk, NY (US)

(72) Inventors: Chen Chen, Haifa (IL); Avraham Harpaz, Haifa (IL); Nir Naaman, Haifa (IL); Yoav Tock, Haifa (IL)

(73) Assignee: International Business Machines Corporation, Armonk, NY (US)

(*) Notice: Subject to any disclaimer, the term of this patent is extended or adjusted under 35 U.S.C. 154(b) by 239 days.

(21) Appl. No.: 14/924,749

(22) Filed: Oct. 28, 2015

(65) Prior Publication Data

US 2017/0126603 A1    May 4, 2017

(51) Int. Cl.
*H04L 12/58* (2006.01)
*H04L 29/06* (2006.01)

(52) U.S. Cl.
CPC .............. *H04L 51/14* (2013.01); *H04L 67/42* (2013.01)

(58) Field of Classification Search
CPC ................................ H04L 51/14; H04L 67/42
See application file for complete search history.

(56) References Cited

U.S. PATENT DOCUMENTS

| 2002/0087630 | A1* | 7/2002 | Wu | G06F 17/2247 709/203 |
| 2006/0085507 | A1* | 4/2006 | Zhao | G06Q 10/10 709/206 |
| 2010/0281154 | A1 | 11/2010 | Bedi et al. | |
| 2012/0311051 | A1 | 12/2012 | Banks et al. | |
| 2014/0286354 | A1 | 9/2014 | Van De Poel et al. | |
| 2015/0012551 | A1 | 1/2015 | Dong et al. | |
| 2015/0134750 | A1 | 5/2015 | Srinivasan | |

OTHER PUBLICATIONS

Morales Dominguez et al., "An Extended Topic-Based Pub/Sub Broker for Cooperative Mobile Services", Advanced Information Networking and Applications Workshops (WAINA), 2013 27th International Conference on Mar. 25-28, 2013, pp. 1313-1318.

* cited by examiner

*Primary Examiner* — Kim T Nguyen
(74) *Attorney, Agent, or Firm* — Ziv Glazberg

(57) ABSTRACT

A method, product and apparatus for distributing retained messages information in a clustered publish/subscribe system. The method comprising obtaining a set of Retained Message Filters (RMFs) comprising a RMF for each server in the cluster, wherein the RMF representing a set of topics for which retained messages are retained by the server, the RMF being configured to approximate whether the server retains a retained message that matches a subscription; responsive to receiving a subscription request from a client, applying the set of RMFs to the subscription to obtain an indication of a set of servers that potentially retain retained messages that match the subscription; triggering each server in the set of servers to perform retrieval of retained messages that match the subscription; and sending to the client the retained messages retrieved from the servers in the set of servers.

20 Claims, 7 Drawing Sheets

DISTRIBUTING RETAINED MESSAGES INFORMATION IN A CLUSTERED PUBLISH/SUBSCRIBE SYSTEM

TECHNICAL FIELD

The present disclosure relates to information distribution among a cluster of servers in general, and to retained messages information distribution in a clustered publish/subscribe system, in particular.

BACKGROUND

Publish/subscribe (pub/sub) has become a popular communication paradigm that provides a loosely coupled form of interaction among many publishing data sources and many subscribing data sinks. One type of such system is topic-based pub/sub, wherein publishers associate each publication message with one or more specific topics, and subscribers register their interests in a subset of all topics. In many pub/sub systems clients interact with a single server, also referred to as "broker", that is responsible for providing the required pub/sub services, such as delivering a message published on a topic to clients that subscribed to this topic. In order to provide a large scale pub/sub service, multiple brokers are grouped together to form a cluster. The brokers in the cluster collaborate and exchange information in order to provide pub/sub service to a large group of clients.

Some Internet of Things (IoT) systems rely on the Message Queue Telemetry Transport (MQTT) protocol or other pub/sub protocols to offer advanced connectivity and communication between enterprise applications and IoT devices. A cloud-hosted IoT infrastructure may be expected to support tens or hundreds of millions of IoT devices. To accommodate such large-scale workloads, deployment of many MQTT brokers on geographically distributed data centers may be desired or required.

MQTT is a pub/sub messaging protocol, designed for low resources devices and networks. MQTT treats topics as a hierarchy, using slash (/) as a separator. When a client publishes a message, the publication is for a specific topic. Clients can receive published messages by subscribing to the topics they are interested in. A subscription could be for a specific, exact topic (e.g., "/weather/usa/new-york"), or it could be a wildcard subscription for multiple topics (e.g., "/weather/usa/#"). MQTT defines two wildcards: '+' and '#'. The symbol + represents a single level of hierarchy in the subscription, and the symbol # stands for zero or more levels of hierarchy. Specifically, in MQTT, # must be the last symbol in a wildcard subscription. However, other pub/sub protocols may allow for wildcard subscriptions with # appearing at any level (e.g., "/#/usa/new-york").

One feature defined by MQTT is support for retained messages. The publisher may set any message to be retained for a topic. The broker will keep the retained message even after sending it to all current subscribers. If a client issues a new subscription that matches the topic of the retained message, then the client will receive the message. Under MQTT, at most one retained message is kept per topic; that is, if a topic has a retained message and a new retained message is received then the new message will replace the previous message and the old message will be discarded. However, other protocols may support multiple retained messages per topic. In the context of IoT, retained messages may be used by the connected devices to record their current status for quick update or recovery purposes, for example.

BRIEF SUMMARY

One exemplary embodiment of the disclosed subject matter is a computer-implemented method performed by a server in a cluster of publish/subscribe system, the method comprising: obtaining a set of Retained Message Filters (RMFs) comprising a RMF for each server in the cluster, wherein the RMF representing a set of topics for which retained messages are retained by the server, the RMF being configured to approximate whether the server retains a retained message that matches a subscription; responsive to receiving a subscription request from a client, applying the set of RMFs to the subscription to obtain an indication of a set of servers that potentially retain retained messages that match the subscription; triggering each server in the set of servers to perform retrieval of retained messages that match the subscription; and sending to the client the retained messages retrieved from the servers in the set of servers.

Another exemplary embodiment of the disclosed subject matter is computerized apparatus having a processor and being designated as a server in a cluster of publish/subscribe system, the processor being adapted to perform the steps of: obtaining a set of Retained Message Filters (RMFs) comprising a RMF for each server in the cluster, wherein the RMF representing a set of topics for which retained messages are retained by the server, the RMF being configured to approximate whether the server retains a retained message that matches a subscription; responsive to receiving a subscription request from a client, applying the set of RMFs to the subscription to obtain an indication of a set of servers that potentially retain retained messages that match the subscription; triggering each server in the set of servers to perform retrieval of retained messages that match the subscription; and sending to the client the retained messages retrieved from the servers in the set of servers.

Yet another exemplary embodiment of the disclosed subject matter is a computer program product comprising a computer readable storage medium retaining program instructions directed at a server in a cluster of publish/subscribe system, which program instructions when read by a processor, cause the processor to perform a method comprising: obtaining a set of Retained Message Filters (RMFs) comprising a RMF for each server in the cluster, wherein the RMF representing a set of topics for which retained messages are retained by the server, the RMF being configured to approximate whether the server retains a retained message that matches a subscription; responsive to receiving a subscription request from a client, applying the set of RMFs to the subscription to obtain an indication of a set of servers that potentially retain retained messages that match the subscription; triggering each server in the set of servers to perform retrieval of retained messages that match the subscription; and sending to the client the retained messages retrieved from the servers in the set of servers.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
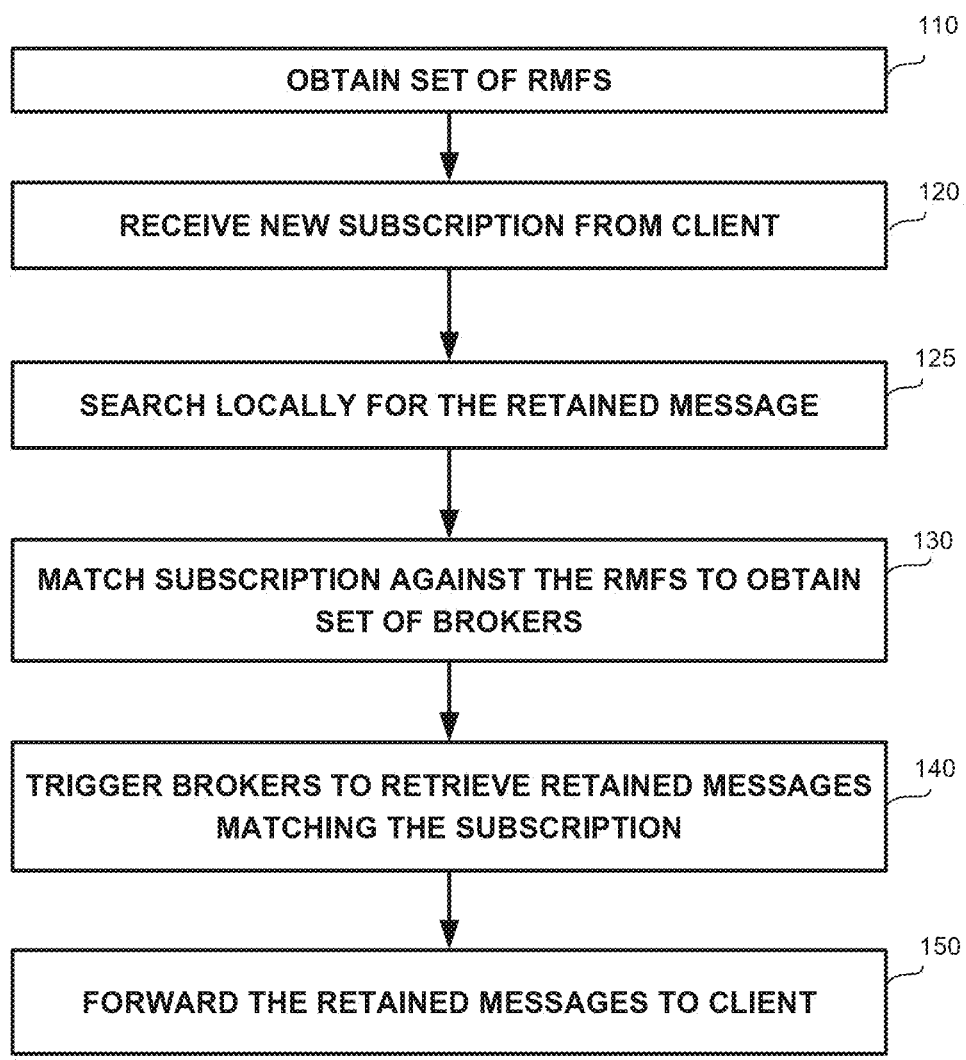
FIG. 1A shows a flowchart diagram of a method for supporting retained messages in a clustered pub/sub system, in accordance with some exemplary embodiments of the subject matter.

One technical problem dealt with by the disclosed subject matter is to handle retained messages in clustered pub/sub systems in an efficient and scalable manner, while supporting wildcard subscriptions as well.

One technical challenge to implementing a clustered pub/sub system using MQTT or similar protocols is supporting retained messages for wildcard subscriptions. The basic problem of handling retained messages in a cluster is that while the message is published to a single broker, it must be delivered to any new client that subscribes to the relevant topic on any other broker in the cluster. Some potential approaches to address retained messages in a cluster of brokers suffer from significant drawbacks and might not be applicable to wildcard subscriptions.

One approach may be to allocate a single central service to handle retained messages ("single service approach"). The central service may be external to the cluster, or it can be internal, where one "leader broker" is elected to host all retained messages. The pub/sub system forwards all wildcard subscriptions to the central service, which returns the retained messages whenever there is a match. This approach suffers from a number of scalability problems, because the external service (or leader broker) is a bottleneck in terms of both resources and performance. First, the central service has to store all retained messages for a large volume of topics. Second, the central service has to serve all requests of retained messages for the entire network. In addition, since the central service is a single point of failure, it may be desired that it be made highly available which complicates the implementation and the setup of the cluster.

Another approach may be to send all retained messages to all other brokers in the cluster and maintain them on each broker ("full replication approach"). Thus, each broker has the full set of retained messages and can handle its local subscriptions without interacting with any external resource. This approach eliminates the bottleneck and single point of failure in the central service approach, but creates a significant scaling problem since each broker now has to maintain all the retained messages in the cluster, while only a small portion of these messages is likely to be used by it. In addition to the scalability issues, the requirement to maintain the full set of retained messages on all brokers further complicates the implementation, such as in handling sending of all the messages to a newly added broker.

Another approach, in attempt to improve the scalability of the full replication approach, may be to send only the list of retained message topics to all brokers, but keep the messages themselves only on the local server ("topic information replication approach"). However, this approach does not fully address the scalability issue, since each broker must still keep the list of all the topics with retained messages in the cluster. Since the number of such topics might be very large, brokers may not have sufficient resources to store the entire list. In addition, the large number of topics is likely to slow down the search for the retained message information when processing a new subscription.

Yet another approach may be to employ a Distributed Hash Table (DHT) to organize all brokers and their corresponding retained messages in a structured manner ("DHT based approach"). A unique identifier is assigned to each broker randomly. Similarly, a unique hash value is computed for each retained message and the message is stored to the broker whose identifier is closest to the hash value. This approach may work well if the system only contains exact subscriptions. However, given a wildcard subscription, the system has to broadcast this wildcard subscription to all brokers in order to retrieve the matched retained message. As a result, it would incur significant amount of communication and computation overhead upon the entire network for handling wildcard subscription queries. Moreover, it may lead to considerable delay and hurt responsiveness.

One technical solution is to maintain by each broker only some retained messages (e.g., retained messages published by the clients directly connected to it), and distribute the information about its list of topics with retained messages to all other brokers in a compacted manner using a Retained Message Filter (RMF). The RMF may be constructed to allow for efficiently testing whether the broker contains retained messages that match an incoming wildcard subscription. The RMF may be an approximation of the topics of the set of retained messages by the server. Each broker may retain a set of all RMFs of all brokers in the cluster. When a broker receives a subscription request from a client, it matches the subscription against the RMF of each broker to detect a potential match. If a potential match is detected, the corresponding broker is triggered to search its local storage and retrieve messages that match the subscription to be forwarded to the client.

In some exemplary embodiments, the broker may first search its local storage before applying the RMFs of other brokers.

In some exemplary embodiments, the RMF may be an over-approximation of the set of topics of the retained messages retained by the broker. The RMF may over approximate the set, thereby providing no false-negative indication (e.g., a topic that is member of the set is guaranteed to be so indicated by the RMF) and potentially providing false positive indication (e.g., a topic that is not a member of the set may erroneously be indicated as a member by the RMF). Additionally or alternatively, the RMF may be configured to have a low false positive probability, such as below a threshold, such as without limitation, less than about 10%, less than about 5%, less than about 1%, or the like.

In some exemplary embodiments, the RMF may be configured to allow for the match to complete with local information only.

In some exemplary embodiments, the RMF may be constructed using one or more Bloom filters. A Bloom filter is a probabilistic data structure for representation of a set in order to support membership queries (i.e., queries that ask: "Is element X in set Y?"). Although Bloom filters allow for compact representation, the tradeoff is a small rate of false positive matches; that is, an element might be incorrectly recognized as a member of the set. On the other hand, Bloom filters do not allow for false negatives, thus a query returns either "possibly in set" or "definitely not in set".

In some exemplary embodiments, the RMF may be constructed by enumerating potential matching subscriptions with zero or one or more wildcards. A broker may maintain a single Bloom filter for all topics with a locally stored retained message. For each such message, a set of variants that represent subscriptions possibly matching a topic of that message may be inserted into the Bloom filter. The set of variants may include the actual topic to address exact subscriptions and in addition all variants for wildcard subscriptions in a predetermined format. For example, the set of variants may include all variants having exactly one wildcard. In the context of MQTT pub/sub systems, such a set would include all versions of the exact topic with either a '+' in one level or ending with '#'.

As an illustrative example, consider a retained message with a topic "datacenter01/computer23/temperature". The set of variants for this topic may include:

The variant for the exact subscription: "datacenter01/computer23/temperature"

The variants for wildcard subscriptions with a single '+':
"+/computer23/temperature"
"datacenter01/+/temperature"
"datacenter01/computer23/+"

The variants for wildcard subscriptions with a single '#':
"datacenter01/computer23/#"
"datacenter01/#"
"#"

The RMF may further include an indication of its scope, indicating the type or predetermined format of subscriptions covered by the RMF. In the example illustrated above, the RMF covers any subscription with no more than either one '+' or one '#'. When a new subscription request is made, the subscription may be matched against the RMF by checking first if the subscription is in the scope of the RMF, and if so then the subscription may be matched against the Bloom filter and the result of the match may be returned accordingly. Otherwise, the RMF may return TRUE, whereby indicating that existence of retained messages for that subscription at the corresponding broker cannot be ruled out, and thus it needed to be searched locally. For example, in the case illustrated above, an incoming subscription of "datacenter02/+/+" would be considered not in scope, as it contains multiple wildcards. Accordingly, the RMF would return a positive result, and a search in the actual records of the respective broker may follow.

In some exemplary embodiments, the RMF may be constructed from a set of sub-filters, each of which corresponding to a different level in the hierarchy of topic names. For example, a Bloom filter may be maintained for each level in the topic space, up to the maximal number of levels for a topic of the broker's retained messages or up to another maximal threshold.

As an illustrative example, consider again the retained message with the topic "datacenter01/computer23/temperature". The RMF may thus be updated by inserting "datacenter01" to the Bloom filter of the first level, inserting "computer23" to the Bloom filter of the second level, and inserting "temperature" to the Bloom filter of the third level. When a new subscription is made, it may be matched against the RMF by checking for a match of each non-wildcard level in the subscription against the corresponding Bloom filter for that level in the RMF. Wildcard levels in the subscriptions may be assumed matched. Accordingly, for a subscription with len levels the procedure may be as follows:

For j=1 to len
  If level j is not a wildcard, match the content of this level against the Bloom filter of level j;
    if there is no match, return FALSE;
    else if j==len return TRUE;

Thus, if for all non-wildcard levels a match is found in the respective Bloom filters of these levels, then the subscription may be deemed as matched. The above procedure may be suitable for pub/sub system employing the MQTT protocol, where the multi-level wildcard '#', if present, must be the last level. In cases where the multi-level wildcard can appear anywhere in the subscription, some modifications may be introduced to handle subscriptions with a multi-level wildcard appearing before the last level. For example, a subscription of "A/B/C/#/E" may be processed as "A/B/C/#" when matched against the RMF. Additionally or alternatively, a multi-level skip may be performed and the search for the remaining part may continue in the Bloom filters of higher levels. Thus, in the previous example of the subscription "A/B/C/#/E", a match for the sub-topic "E" may be looked for in all levels from four and above, such as by matching the series "A/B/C/E", "A/B/C/+/E", "A/B/C/+/+/E", etc., until the maximal length (number of levels/Bloom filters in the particular RMF) for a topic is reached.

In some exemplary embodiments, instead of inserting the actual content of a level in a topic to the corresponding Bloom filter, compacted representations for such content, referred to as "fingerprints", may be utilized. In some exemplary embodiments, a fingerprint may be produced for each level and used instead of standard Bloom filter hashing. For example, each level may be associated with a modulus q, and sub-topics in that level may be mapped to values between 0 and q−1, which may then be inserted to the respective Bloom filter for that level. The modulus $q_i$ associated with level i may be different from the modulus $q_j$ associated with level j, for i≠j. Given an incoming subscription, fingerprints may be produced at each level in accordance with the same mapping and matched against the corresponding Bloom filter.

As an illustrative example, consider again the retained message with the topic "datacenter01/computer23/temperature". For illustrative purposes, assume q=7 for all levels, and that the following fingerprints at each level are produced:

level 1: fp("datacenter01")=2;
level 2: fp("computer23")=5;
level 3: fp("temperature")=3;

Given an incoming subscription "datacenter01/+/temperature", the same mapping may be used to produce the following fingerprints at each level for matching:

level 1: fp("datacenter01")=2;
level 2: fp("+")={0; 1; 2; 3; 4; 5; 6};
level 3: fp("temperature")=3;

As can be readily understood, the fingerprint at level 2 contains all possible values for the modulus of that level, since this level is a wildcard character. In some exemplary embodiments, wildcard levels may be skipped when performing the match.

In some exemplary embodiments, the level fingerprints may be used to create a combined fingerprint representing multiple levels at once. Accordingly, a single Bloom filter may be maintained instead of the set of per level Bloom filters. The combined fingerprint may be a concatenation of the fingerprints at each level. The fingerprint at level i may be generated using a mapping of the sub-topic at level i to a value in $[0; q_i)$, similarly as described above.

As an illustrative example, consider again the retained message with the topic "datacenter01/computer23/temperature". For illustrative purposes, assume that q=7 for all levels, and that the following fingerprints at each level are produced:
    level 1: fp("datacenter01")=2;
    level 2: fp("computer23")=5;
    level 3: fp("temperature")=3;
Thus, the resulting combined fingerprint to be inserted to the Bloom filter is "2/3/5". Given an incoming subscription "datacenter01/+/temperature", the same mapping may be used to produce the following fingerprints at each level for matching:
    level 1: fp("datacenter01")=2;
    level 2: fp("+")={0; 1; 2; 3; 4; 5; 6};
    level 3: fp("temperature")=3;
Accordingly, the combined fingerprints to be matched against the Bloom filter are: "2/0/3", "2/1/3", "2/2/3", "2/3/3", "2/4/3", "2/5/3", "2/6/3".

Each of the above methods for constructing and using RMFs to match subscriptions may be employed either individually or in combination with one another.

One technical effect of utilizing the disclosed subject matter is to support retained messages in a clustered publish/subscribe system, in a manner that is scalable and efficient both in time and in space, with relatively modest overhead in operations, such as additional searches due to false positives.

Another technical effect of utilizing the disclosed subject matter is to handle retained messages for wildcard subscriptions.

Referring now to FIG. 1A showing a flowchart diagram of a method for supporting retained messages in a clustered pub/sub system, in accordance with some exemplary embodiments of the disclosed subject matter.

On Step 110, a set of Retained Messages Filters (RMFs) may be obtained. Each RMF may represent a collection of retained messages stored locally by a broker in a cluster of a pub/sub system. The RMF may be designed to allow for quickly testing whether the respective broker possibly contains retained messages that match a given subscription. The RMF may support matching of exact subscriptions as well as wildcard subscriptions. The set of RMFs may be replicated among all brokers in the cluster. The set of RMFs may be obtained by each broker in the cluster by using either push or pull messaging patterns. In some exemplary embodiments, a broker may obtain RMFs of all brokers other than itself and utilize a different method to determine whether a retained message is stored locally, such as using a precise list.

On Step 120, a new subscription request may be received from a client. The subscription may be received by one of the brokers in the cluster from some client associated with that broker. The subscription may either be a wildcard subscription or an exact subscription.

On Step 125, the broker receiving the subscription may search locally to determine whether or not it retains locally a retained message corresponding to the subscription. In some exemplary embodiments, in case a retained message is located, the retained message may be retrieved and forwarded to the client. In some exemplary embodiments, such as in case of a single retained message per topic and having an exact topic, the method may end.

On Step 130, the subscription received on Step 120 may be matched against the RMFs obtained on Step 110, in order to obtain an indication of a set of brokers possibly containing retained messages that match the subscription. The broker at which the subscription was received may apply each of the RMFs to the subscription, and in case that a match is found, the respective broker to which the RMF that returned the possible match belongs may be added to the set.

On Step 140, each of the brokers in the set of brokers indication obtained on Step 130 is triggered to retrieve retained messages that match the subscription. The broker that received the subscription may forward the subscription to all brokers in the set, and each broker may query its local retained messages repository to retrieve retained messages that match the subscription.

As can be readily understood, Step 125 may be omitted and the set of brokers may include the broker that received the subscription from the client as well, in which case forwarding may not be required and the receiving broker may go on to locally search its own repository. In such a case, the RMF of the broker is used to avoid performing searching the local retained messages repository in some cases where the RMF indicates that the subscription is not retained locally.

On Step 150, the retained messages obtained on Step 140 may be forwarded to the client that requested the subscription. The brokers in the set may return the locally retrieved messages to the broker that received the subscription, which may collect them and forward them to the client. Alternatively, the messages may be forwarded to the client directly by each of the brokers.

Figure 1B:
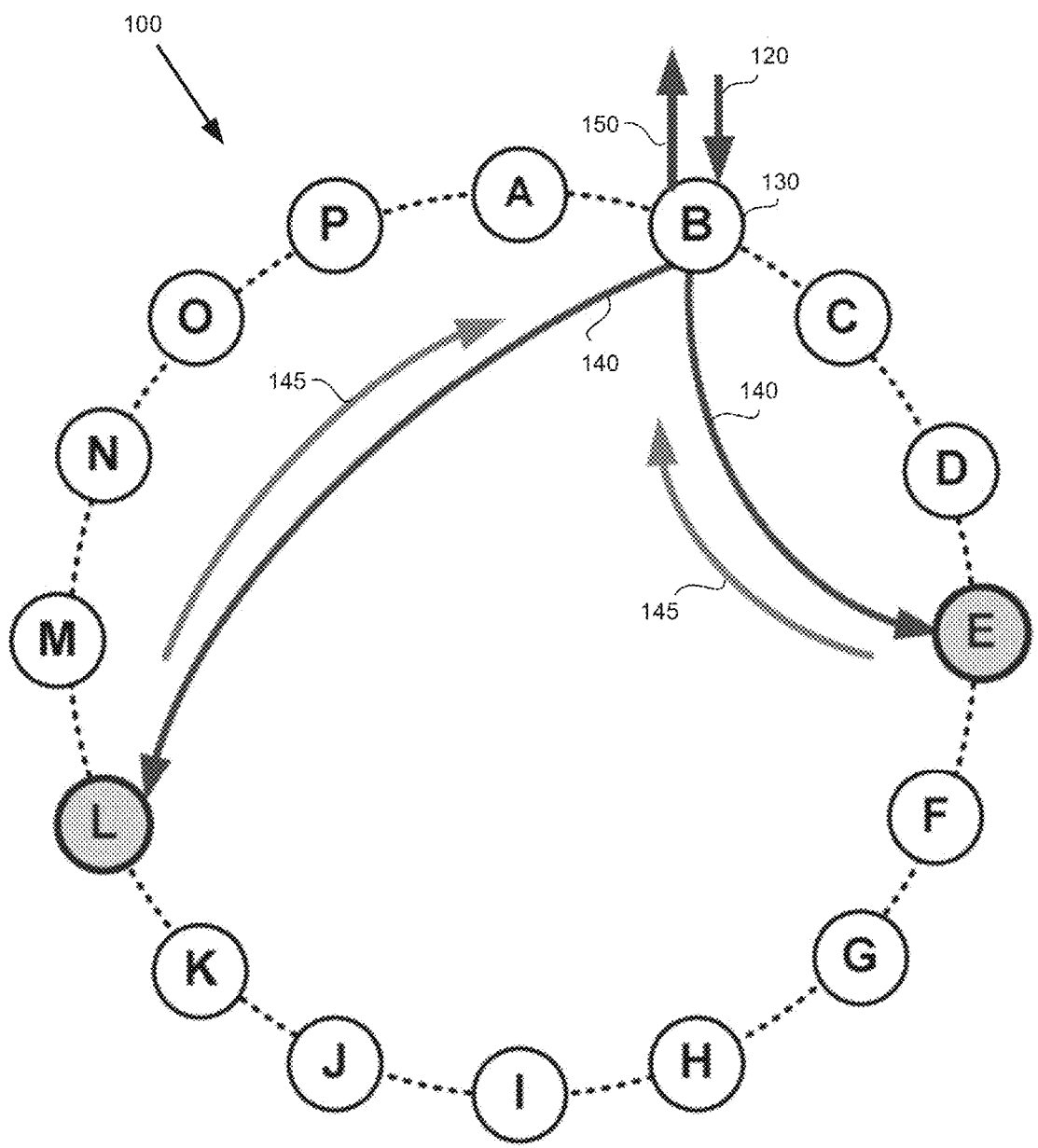
FIG. 1B shows a schematic exemplary environment in which the disclosed subject matter is used, in accordance with some exemplary embodiments of the subject matter.

Referring now to FIG. 1B showing a schematic exemplary environment in which the disclosed subject matter is used, in accordance with some exemplary embodiments of the subject matter.

A clustered pub/sub system 100 may comprise a plurality of brokers, such as Brokers A to P. Each broker may maintain only its local retained messages, e.g. the messages that have been published by clients directly connected to this broker. Each broker may maintain a RMF representing the list of topics for all retained messages stored locally by that broker. For example, Broker A may keep $RMF_A$ representing the retained messages stored in Broker A, Broker B may keep $RMF_B$ representing the retained messages stored in Broker B, and so forth. Each broker may send the RMF to all other brokers. Each broker may maintain a set of RMFs which contain at least one RMF for each broker in the cluster. For example, all Brokers A to P may maintain the set $\{RMF_A, RMF_B \ldots, RMF_P\}$. In some exemplary embodiments, the set may exclude the RMF of the broker itself. For example, Broker B may maintain the set $\{RMF_A, RMF_C \ldots, RMF_P\}$.

In some exemplary embodiments, each broker may also replicate its local messages to a small subset of the brokers in the cluster to ensure the availability of the retained messages.

FIG. 1B further presents an example of a possible workflow for retrieving retained messages for an incoming subscription, in accordance with some exemplary embodiments of the subject matter.

On Step 120, a subscription may be received from a client at one of the brokers in the cluster, similarly as in FIG. 1A. In the example presented in FIG. 1B, the broker receiving the subscription is Broker B.

On Step 130, Broker B may feed the subscription to the set of RMFs to obtain an indication of a set of brokers that may contain retained messages matching the subscription, similarly as in FIG. 1A. In the example presented in FIG. 1B, the set of brokers contains Broker E and Broker L.

On Step 140, Broker B may trigger the brokers in the set to retrieve retained messages that match the subscription, similarly as in FIG. 1A. Broker B may forward the subscription to each member in the set, i.e. to Brokers E and L, in this case. Brokers E and L may query their local retained message records and retrieve the corresponding retained messages that match subscription.

On Step 145, Brokers E and L may return the retrieved messages to Broker B.

On Step 150, Broker B may collect the retained messages returned from Brokers E and L and send them to the client that issued the subscription.

Figure 2A:
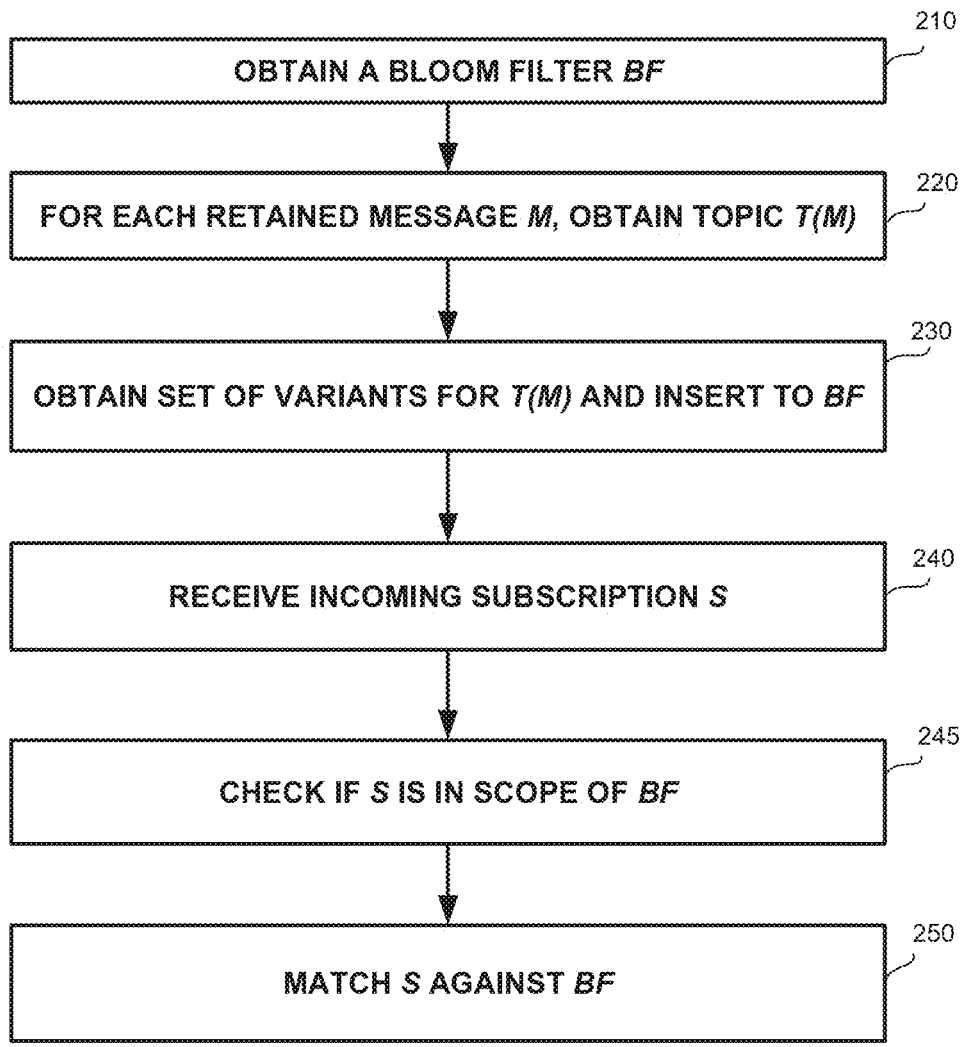
FIG. 2A shows a flowchart diagram of a method for constructing and using a RMF for matching a subscription, in accordance with some exemplary embodiments of the disclosed subject matter.

Referring now to FIG. 2A showing a flowchart diagram of a method for constructing and using a RMF for matching a subscription, in accordance with some exemplary embodiments of the subject matter.

On Step 210, a Bloom filter or any equivalent data structure, denoted hereinafter as BF, may be obtained, e.g. by allocating an array of bits and defining a plurality of hash functions. In some exemplary embodiments, BF may be defined and initialized such as by zeroing all the bits in the array.

On Step 220, for each retained message m in the local repository of retained messages, a topic t(m) may be obtained. The topic t(m) may be specified by the client that published the message m as meta-data or determined by the broker using text analysis techniques.

On Step 230, a set of variants for t(m) may be obtained and inserted into BF. The set may include the variant for the exact subscription t(m) as well as variations on t(m) in which one or more levels are substituted by a wildcard. For example, the set of variants may include variations having the one-level wildcard '+' in one of the levels, variations ending with the multi-level wildcard '#', or the like. In some exemplary embodiments, the variations may be generated on the fly. In some exemplary embodiments, the variations generated may be subject to a constraint such as a maximal predetermined number of wildcards (e.g., no more than three wildcards), a maximal predetermined number of particular wildcards (e.g., no more than two "+" wildcards), or another constraint.

On Step 240, an incoming subscription s may be received from a client, similarly as in Step 120 of FIGS. 1A-1B.

On Step 245, a check may be performed to determine if the incoming subscription s is in the scope of the Bloom filter BF, namely, if the format of s fits to any of the types of variants constructed and used to populate BF on Step 230. In some exemplary embodiments, the constraints under which the variations were generated may dictate the scope. In case that s is not in the scope, a positive result may be returned.

On Step 250, responsive to determining that s is in the scope of BF on Step 245, s may be matched against BF and the result may be returned accordingly.

Figure 2B:
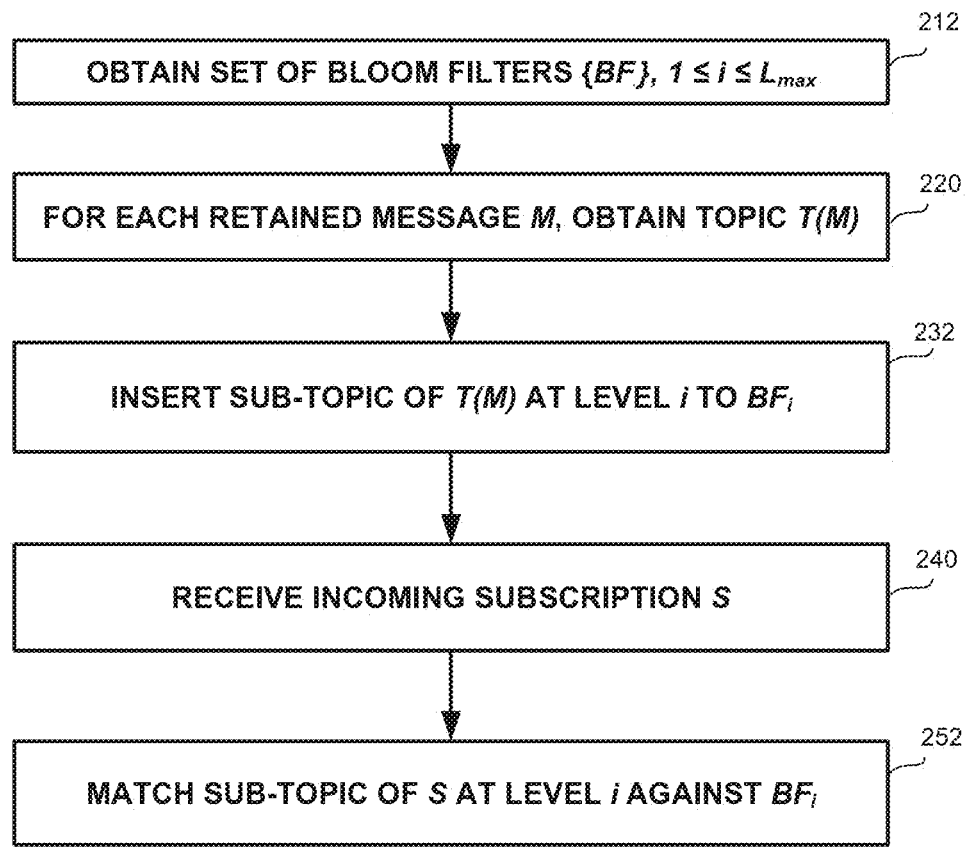
FIG. 2B shows a flowchart diagram of a method for constructing and using a RMF for matching a subscription, in accordance with some exemplary embodiments of the disclosed subject matter.

Referring now to FIG. 2B showing a flowchart diagram of a method for constructing and using a RMF for matching a subscription, in accordance with some exemplary embodiments of the subject matter.

On Step 212, a set of Bloom filters or equivalent data structures, denoted hereinafter as $\{BF_i\}$, each corresponding to a level i in the topic space for some $1 \leq i \leq L_{max}$, wherein $L_{max}$ is the maximum number of levels in a topic for the set of locally stored retained messages, may be obtained. In some exemplary embodiments, $L_{max}$ may be a predetermined maximal threshold on the number of levels that are used by the RMF for matching albeit there being additional levels.

On Step 220, for each retained message m in the local repository of retained messages, a topic t(m) may be obtained, similarly as in FIG. 2A.

On Step 232, the sub-topic of t(m) at level i may be inserted to the corresponding Bloom filter for that level $BF_i$, for all levels $1 \leq i \leq len(t(m))$, wherein len(t(m)) is the number of levels of the topic t(m). In some exemplary embodiments, in case the number of levels of the topic t(m) is greater than the maximal level ($L_{max}$), the sub-topic may be inserted for all levels $1 \leq i \leq L_{max}$.

On Step 240, an incoming subscription s may be received from a client, similarly as in FIG. 2A.

On Step 252, each non-wildcard level i of the subscription s may be matched against the corresponding Bloom filter for that level $BF_i$. In case that in one of the levels there is no match, then a negative result may be returned. Otherwise if a match is found for all non-wildcard levels of s then a positive result may be returned, as all wildcard levels are assumed matched. In some exemplary embodiments, the subscription s may be pre-processed prior to the matching against the set of Bloom filters $\{BF_i\}$ to eliminate levels after a multi-level wildcard. Alternatively, a subsequent match for those remaining levels may be searched for in the subset(s) of Bloom filters starting at the level of the wildcard and higher, in a similar manner as described herein.

Figure 2C:
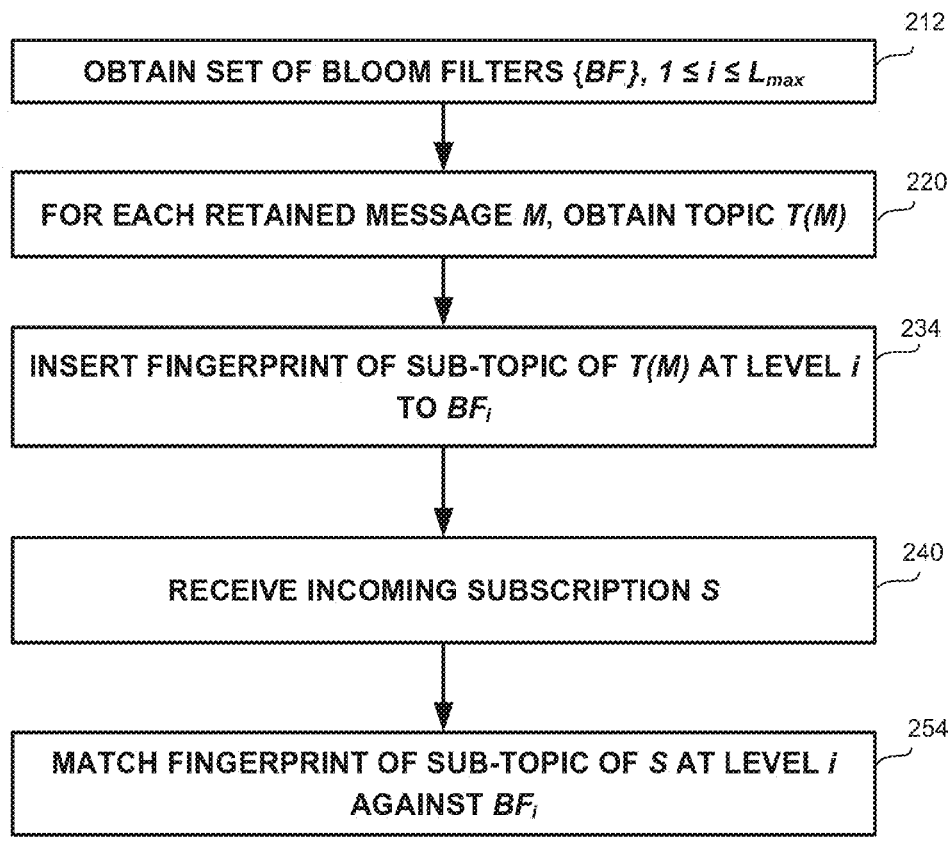
FIG. 2C shows a flowchart diagram of a method for constructing and using a RMF for matching a subscription, in accordance with some exemplary embodiments of the disclosed subject matter.

Referring now to FIG. 2C showing a flowchart diagram of a method for constructing and using RMF for matching a subscription, in accordance with some exemplary embodiments of the subject matter.

On Step 212, a set of Bloom filters $\{BF_i\}$, each corresponding to a level i in the topic space for some $1 \leq i \leq L_{max}$, may be obtained, similarly as in FIG. 2B.

On Step 220, for each retained message m in the local repository of retained messages, a topic t(m) may be obtained, similarly as in FIGS. 2A-2B.

On Step 234, a fingerprint for the sub-topic of t(m) at level i may be obtained and inserted into the corresponding Bloom filter for that level $BF_i$, for all levels $1 \leq i \leq len(t(m))$, wherein len(t(m)) is the number of levels of the topic t(m). The fingerprint may be obtained by employing a mapping from the domain of sub-topics to a small set of values with succinct representation. For example, for each level i, a modulus $q_i$ may be chosen, such that a sub-topic at the i-th level is mapped to a value in $\{0, 1 \ldots q_i-1\}$.

On Step 240, an incoming subscription s may be received from a client, similarly as in FIGS. 2A-2B.

On Step 254, for each non-wildcard level i of the subscription s, a fingerprint for the sub-topic of s at that level may be obtained and matched against the corresponding Bloom filter for that level $BF_i$. In case that in one of the levels there is no match, then a negative result may be returned. Otherwise if a match is found for all non-wildcard levels of s then a positive result may be returned, as all wildcard levels are assumed matched. The matching of the sub-topics' fingerprints may be performed similarly as the matching of the actual sub-topics performed in Step 252 of FIG. 2B.

In some exemplary embodiments, a wildcard may be used to represent a part of a sub-topic, such as a regular expression defining the sub-topic. As an example, the subscription "datacenter*/+/temperature" may match any topic where the first level sub-topic starts with "datacenter". In some exemplary embodiments, wildcard level i of the subscription s may also be matched based on the fingerprints of sub-topics that correspond to the template defined by the wildcard.

Figure 2D:
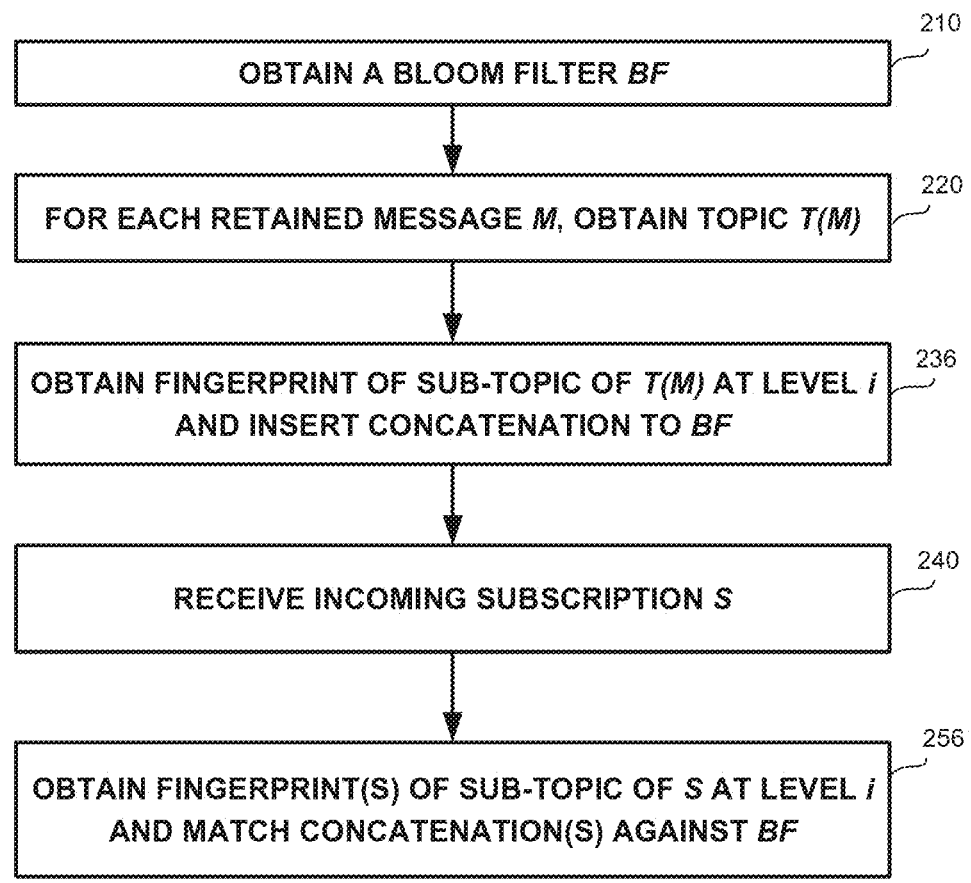
FIG. 2D shows a flowchart diagram of a method for constructing and using a RMF for matching a subscription, in accordance with some exemplary embodiments of the disclosed subject matter.

Referring now to FIG. 2D showing a flowchart diagram of a method for constructing and using a RMF for matching a subscription, in accordance with some exemplary embodiments of the subject matter.

On Step 210, a Bloom filter BF may be obtained, similarly as in FIG. 2A.

On Step 220, for each retained message m in the local repository of retained messages, a topic t(m) may be obtained, similarly as in FIGS. 2A-2C.

On Step 236, a fingerprint for the sub-topic of t(m) at level i may be obtained, similarly as in Step 234 of FIG. 2C, and a combined fingerprint for t(m), composed of a concatenation of the fingerprints of all levels, may be inserted into the Bloom filter BF.

On Step 240, an incoming subscription s may be received from a client, similarly as in FIGS. 2A-2C.

On Step 256, one or more possible combined fingerprints for the subscription s may be obtained and matched against the Bloom filter BF. The combined fingerprints may be obtained by obtaining a fingerprint or a set of possible fingerprints for each level of s and concatenating the fingerprints of all levels. For each non-wildcard level i of s, the fingerprint of the sub-topic of s at level i may be obtained. Otherwise if level i of s is a wildcard level, the corresponding set of all possible fingerprints may be obtained, e.g. the set $\{0, 1 \ldots q_i-1\}$ wherein $q_i$ is the modulus associated with level i; or all possible fingerprints matching the wildcard in case the wildcard is matched by a subset of the sub-topics (e.g., in case of the template "datacenter*", the set $\{0, 1, 5, 8\}$ which may match the sub-topics "datacenter01", "datacenter05", "datacenters" and "datacenter").

Figure 3:
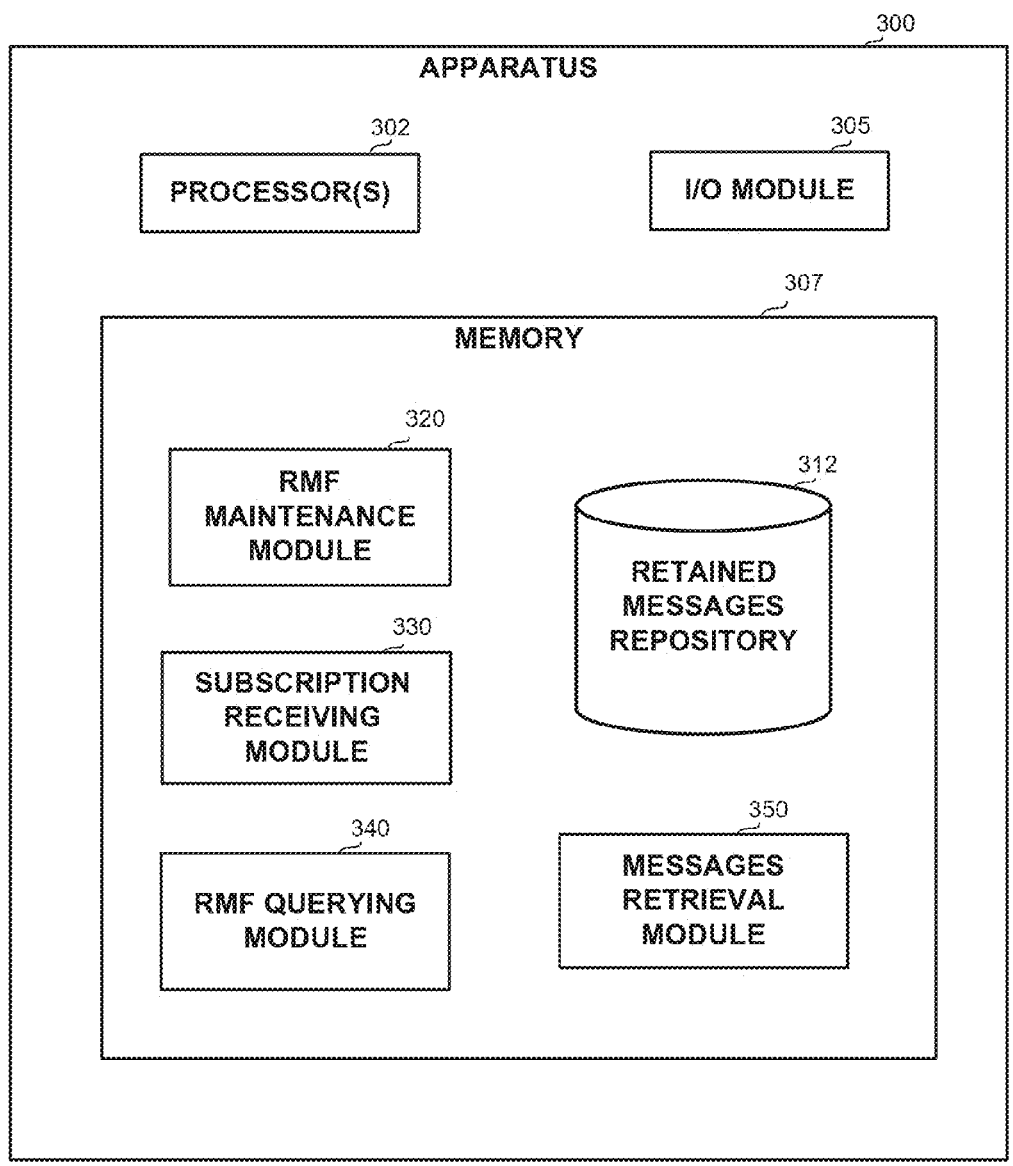
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter. An Apparatus 300, such as Brokers A to P of FIG. 1B, may be configured to provide for handling retained messages in a clustered pub/sub system, in accordance with the disclosed subject matter.

In some exemplary embodiments, Apparatus 300 may comprise one or more processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. I/O Module 305 may be utilized to provide output to and receive input from a user or another Apparatus 300 in communication therewith, such as another one of Brokers A to P of FIG. 1B, or a client associated with any one of them.

In some exemplary embodiments, Apparatus 300 may comprise a Memory 307. Memory 307 may be a hard disk drive, a Flash disk, a Random Access Memory (RAM), a memory chip, or the like. In some exemplary embodiments, Memory 307 may retain program code operative to cause Processor(s) 302 to perform acts associated with any of the subcomponents of Apparatus 300.

Memory 307 may comprise a Retained Messages Repository 312 for storing the retained messages locally on Apparatus 300.

RMF Maintenance Module 320 may be configured to obtain and update a set of RMFs comprising a RMF for each broker in cluster of brokers of a pub/sub system. RMF Maintenance Module 320 may construct one or more RMFs for Apparatus 300 representing the list of topics for all retained messages stored in Retained Messages Repository 312, such as but not limited to, in accordance with any one of the methods of FIGS. 2A-2D or any combination thereof. RMF Maintenance Module 320 may forward the RMF to all other brokers in the cluster and/or obtain any RMF of the other brokers. RMF Maintenance Module 320 may update the set of RMFs accordingly responsive to a change in Retained Messages Repository 312 or in one of the other brokers.

Subscription Receiving Module 330 may be configured to receive incoming subscription requests from clients associated with Apparatus 300. The subscriptions received by Subscription Receiving Module 330 may be either exact subscriptions or wildcard subscriptions, in accordance with the pub/sub protocol used.

RMF Querying Module 340 may be configured to apply the set of RMFs maintained by RMF Maintenance Module 320 to the incoming subscription received at Subscription Receiving Module 330, in search of a possible match. RMF Querying Module 340 may obtain an indication of a set of brokers for which the corresponding RMF returned a positive outcome. RMF Querying Module 340 may employ any suitable matching method or combination of methods corresponding to the one(s) employed by RMF Maintenance Module 320 to construct the respective RMF, in accordance with the methods of FIGS. 2A-2D as described above.

Messages Retrieval Module 350 may be configured to trigger each member in the set of brokers indication obtained by RMF Querying Module 340 to query their local Retained Messages Repository 312 and retrieve all stored retained messages that match the subscription received at Subscription Receiving Module 330. Messages Retrieval Module 350 may forward the subscription to other brokers in the cluster and collect the messages returned therefrom. Messages Retrieval Module 350 may query Retained Messages Repository 312 to retrieve any locally stored retained messages that match the subscription, in case that Apparatus 300 itself is in the set of brokers, or in response to a subscription forwarded from another broker. Messages Retrieval Module 350 may forward the retrieved retained messages to the client that issued the subscription or to the broker that forwarded the subscription, as applicable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a server in
a cluster of publish/subscribe system, the method comprising:
obtaining a set of Retained Message Filters (RMFs) comprising a RMF for each server in the cluster, wherein the RMF representing a set of topics for which retained messages are retained by the server, the RMF being configured to approximate whether the server retains a retained message that matches a subscription;
responsive to receiving a subscription request from a client, applying the set of RMFs to the subscription to obtain an indication of a set of servers that potentially retain the retained messages that match the subscription;
triggering each server in the set of servers to perform retrieval of retained messages that match the subscription; and,
sending to the client the retained messages retrieved from all servers in the set of servers.

2. The computer-implemented method of claim 1, wherein the RMF in the set of RMFs comprises, for each exact topic name of a retained message of the server, a set of variants for the exact topic name comprising at least one wildcard.

3. The computer-implemented method of claim 2, wherein the RMF further comprises a scope indication to indicate variant formats covered by the set of variants, whereby a scope of the RMF can be determined, and wherein said applying comprises matching the subscription against a content of the RMF in response to a determination that the subscription is in the scope.

4. The computer-implemented method of claim 1, wherein the RMF in the set of RMFs comprises a set of sub-filters, each sub-filter corresponds to a different level of a topic name, wherein for each exact topic name of a retained message of the server, a sub-topic at an i-th level of the exact topic name is comprised in the sub-filter of the i-th level.

5. The computer-implemented method of claim 4, wherein said applying comprises matching each non-wildcard level of the subscription against a corresponding sub-filter of the non-wildcard level.

6. The computer-implemented method of claim 1, wherein the RMF in the set of RMFs comprises a set of sub-filters, each sub-filter corresponds to a different level of a topic name, wherein for each exact topic name of a retained message of the server, a fingerprint obtained from a mapping of a sub-topic at an i-th level of the exact topic name to a finite set of values associated with the i-th level is comprised in the sub-filter of the i-th level.

7. The computer-implemented method of claim 6, wherein said applying comprises obtaining one or more sets of fingerprints, each of which corresponding to one of the different levels of the subscription, and matching each set of fingerprints which corresponds to a different level against the corresponding sub-filter of the level.

8. The computer-implemented method of claim 1,
wherein the RMF in the set of RMFs comprises, for each exact topic name of a retained message of the server, a combined fingerprint constructed by substituting each sub-topic of the exact topic name by a fingerprint obtained from a mapping of the sub-topic to a finite set of values associated with a level of the sub-topic; and
wherein said applying comprises obtaining a set of fingerprints for each level of the subscription and matching the combined fingerprints constructed by substituting each level of the subscription by a fingerprint of the set of fingerprints against a content of the RMF.

9. The computer-implemented method of claim 1, wherein the RMF comprises one or more Bloom filters.

10. The computer-implemented method of claim 1, wherein a subscription type may be selected from a group consisting of: an exact subscription; and, a wildcard subscription.

11. The computer-implemented method of claim 1, wherein the RMF is configured to over approximate a set of subscriptions, whereby the RMF is guaranteed to indicate a membership of each subscription that is a member of the set of subscriptions and whereby the RMF is configured to potentially indicate membership of a subscription that is not a member of the set of subscriptions.

12. A computerized apparatus having a processor and being designated as a server in a cluster of publish/subscribe system, the processor being adapted to perform the steps of:
obtaining a set of Retained Message Filters (RMFs) comprising a RMF for each server in the cluster, wherein the RMF representing a set of topics for which retained messages are retained by the server, the RMF being configured to approximate whether the server retains a retained message that matches a subscription;
responsive to receiving a subscription request from a client, applying the set of RMFs to the subscription to obtain an indication of a set of servers that potentially retain the retained messages that match the subscription;
triggering each server in the set of servers to perform retrieval of retained messages that match the subscription; and,
sending to the client the retained messages retrieved from all servers in the set of servers.

13. The computerized apparatus of claim 12, wherein the RMF in the set of RMFs comprises, for each exact topic name of a retained message of the server, a set of variants for the exact topic name comprising at least one wildcard.

14. The computerized apparatus of claim 12, wherein the RMF in the set of RMFs comprises a set of sub-filters, each sub-filter corresponds to a different level of a topic name, wherein for each exact topic name of a retained message of the server, a sub-topic at an i-th level of the exact topic name is comprised in the sub-filter of the i-th level.

15. The computerized apparatus of claim 12, wherein the RMF in the set of RMFs comprises a set of sub-filters, each sub-filter corresponds to a different level of a topic name, wherein for each exact topic name of a retained message of the server, a fingerprint obtained from a mapping of a sub-topic at an i-th level of the exact topic name to a finite set of values associated with the i-th level is comprised in the sub-filter of the i-th level.

16. The computerized apparatus of claim 12,
wherein the RMF in the set of RMFs comprises, for each exact topic name of a retained message of the server, a combined fingerprint constructed by substituting each sub-topic of the exact topic name by a fingerprint obtained from a mapping of the sub-topic to a finite set of values associated with a level of the sub-topic; and wherein said applying comprises obtaining a set of fingerprints for each level of the subscription and matching the combined fingerprint constructed by substituting each level of the subscription by a fingerprint of the set of fingerprints against a content of the RMF.

17. The computerized apparatus of claim 12, wherein the RMF comprises one or more Bloom filters.

18. The computerized apparatus of claim 12, wherein a subscription type may be selected from a group consisting of: an exact subscription; and, a wildcard subscription.

19. The computerized apparatus of claim 12, wherein the RMF is configured to over approximate a set of subscriptions, whereby the RMF is guaranteed to indicate a membership of each subscription that is a member of the set of subscriptions and whereby the RMF is configured to potentially indicate membership of a subscription that is not a member of the set of subscriptions.

20. A computer program product comprising a non-transitory computer readable storage medium retaining a set of program instructions directed at a server in a cluster of publish/subscribe system, which program instructions when read by a processor, cause the processor to perform a method comprising:
   obtaining a set of Retained Message Filters (RMFs) comprising a RMF for each server in the cluster, wherein the RMF representing a set of topics for which retained messages are retained by the server, the RMF being configured to approximate whether the server retains a retained message that matches a subscription;
   responsive to receiving a subscription request from a client, applying the set of RMFs to the subscription to obtain an indication of a set of servers that potentially retain the retained messages that match the subscription;
   triggering each server in the set of servers to perform retrieval of retained messages that match the subscription; and,
   sending to the client the retained messages retrieved from all servers in the set of servers.

* * * * *